June 12, 1923.

W. A. GIBBS

ANIMAL TRAP

Filed Sept. 24, 1919

2 Sheets—Sheet 1

1,458,286

WITNESSES
J. Herbert Bradley

INVENTOR
Walter A. Gibbs
by Dennis Wolcott
Atty

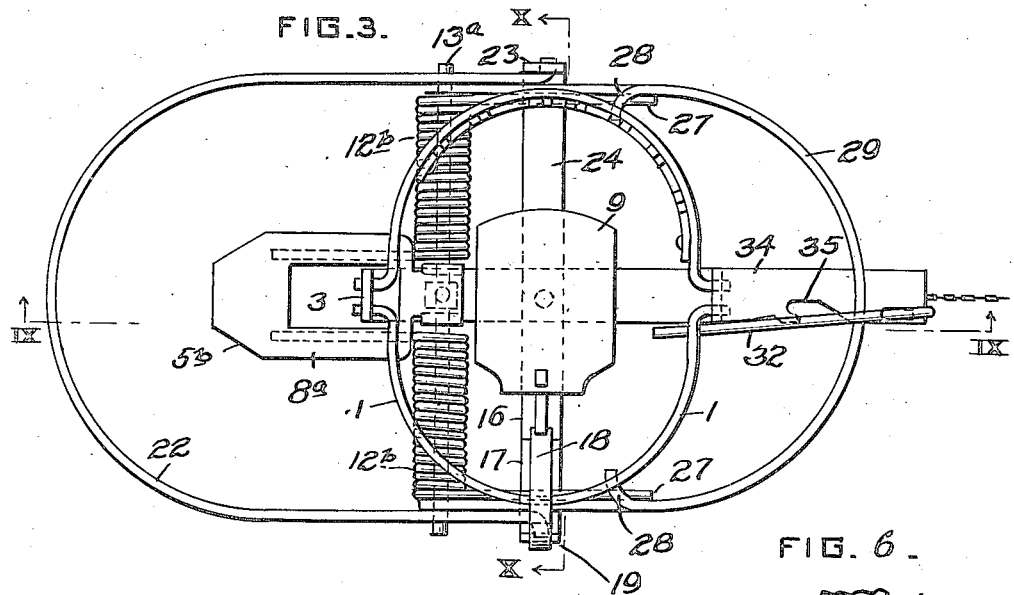
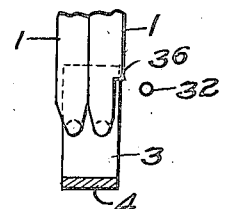
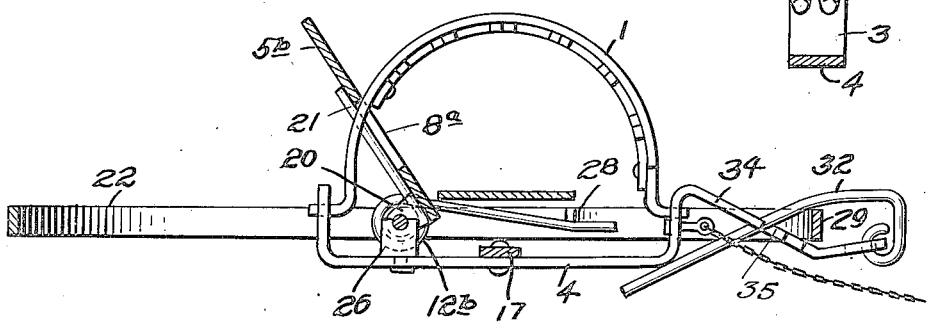
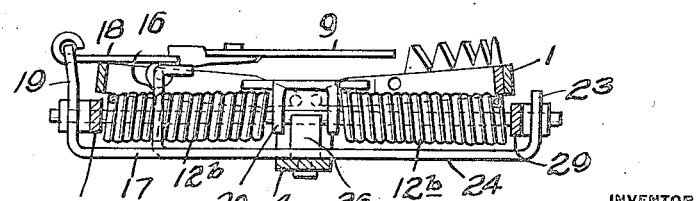

Patented June 12, 1923.

1,458,286

UNITED STATES PATENT OFFICE.

WALTER A. GIBBS, OF WILMINGTON, DELAWARE.

ANIMAL TRAP.

Application filed September 24, 1919. Serial No. 326,053.

*To all whom it may concern:*

Be it known that I, WALTER A. GIBBS, residing at Wilmington, in the county of New Castle and State of Delaware, a citizen of the United States, have invented or discovered certain new and useful Improvements in Animal Traps, of which improvements the following is a specification.

The invention described herein relates to certain improvements in multiple jawed traps and has for its object the provision of an auxiliary jaw adapted to be released at the same time as the jaws of the main or primary trap and in its movement to strike an animal caught by the main trap and pushing it to one side but not free from the main trap, pressing it against the stationary jaws of the auxiliary trap.

Figure 1:
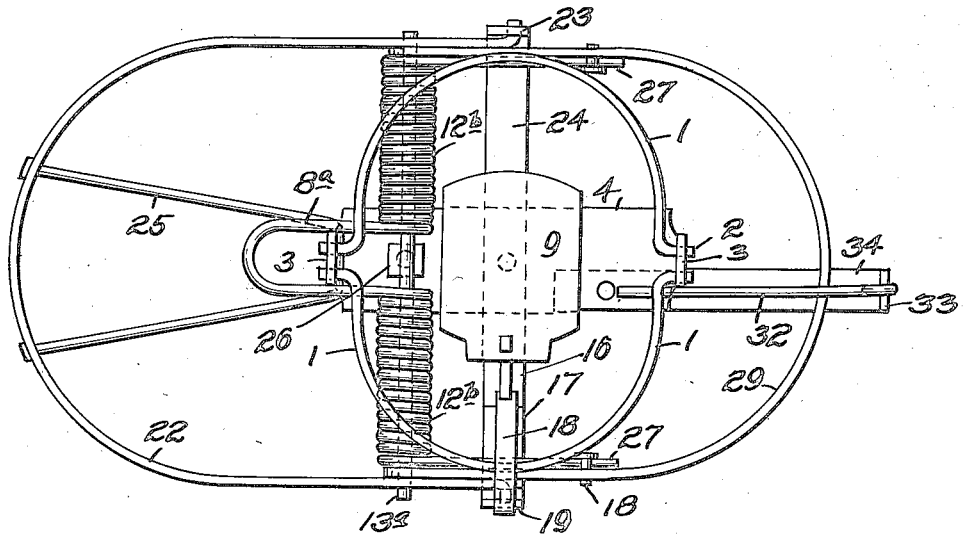
Figure 2:
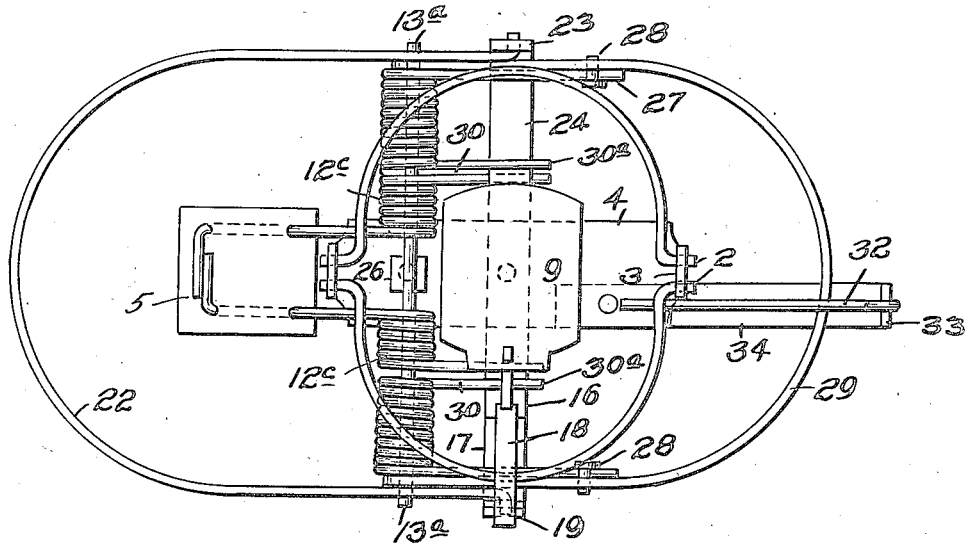

In the accompanying drawings forming a part of this specification, Figs. 1 and 2 are top plan views showing a multiple jawed trap in open position; Fig. 2 is also a modification of the construction of jaw closing elements; Fig. 3 is a plan view showing the multiple jawed trap in operative position and illustrating a further modification of the construction shown in Fig. 1; Fig. 4 is a view partly in section and partly in elevation of the construction shown in Fig. 3, the plane of section being indicated by the line IV—IV, Fig. 3 showing the auxiliary jaw held by the safety lock in open position; Fig. 5 is a sectional view on a plane indicated by the line V—V, Fig. 3 and Fig. 6 is a detail view showing the manner of dislodging the retarding fingers of the auxiliary jaw.

The main trap consists of jaws 1 provided at their ends with trunnions 2 mounted in lugs 3 at opposite ends of the supporting or base member 4 which is of the usual construction. The auxiliary trap consists of a stationary jaw 22 having its ends secured respectively to the lug 19 on the cross-bar 17 and a lug 23 on the end of the extension 24 of the said bar as shown in Figs. 1 to 5 inclusive. If desired the stationary jaw 22 may be more firmly secured to the base 4 of the trap by rods 25 as shown in Fig. 1. The ends of the shaft $13^a$ around which the coiled operating springs are arranged as hereinafter described, are mounted in the stationary jaw 22 and the shaft is preferably supported midway of its length by a block 26 secured to the base 4 of the main trap as shown in Figs. 1 to 5 inclusive. This intermediate support will permit the use of a lighter shaft as it will prevent a distortion or bending of same by the springs. The coils of the springs $12^b$ are provided at their inner or adjacent ends with tangential extensions, the outer portions of which form the jaw closing fingers $8^a$ while the outer ends of these coils are provided with tangential extensions 27 having portions adjacent to their ends engaging on the movable jaw 29 which has its ends pivotally mounted on the shaft $13^a$. This projection may be formed by pins 28 as shown in Figures 1 and 2 or by shoulders $28^a$ integral with the jaw 29 as shown in Figure 3. As shown in Figure 1, the spring sections $12^b$ may be formed of the same length of wire, the tangential extensions forming the jaw closing fingers $8^a$ being integrally connected, or these spring sections may be made independent and the outer ends of the tangential extensions may be secured to a plate 5 as shown in Fig. 2. In the construction shown in Figs. 3, 4 and 5, the tangential extensions 21 of the closing spring are secured to a slide plate provided with lugs 20 at its inner end, said lugs pivotally engaging the shaft $13^a$, passing through coils of the jaw closing springs. It will be observed that the tangential extensions at opposite ends of the coils $12^b$ extend in opposite directions and from opposite sides of the coils so that when free to move, these extensions will move in such directions as to force the main jaws 1 of the trap towards each other and to cause the movable jaw 29 to sweep across the main trap to strike against the stationary jaw 22. The movable or auxiliary jaw 29 is so mounted that when moved to operative position, one side will pass down between the post 16 and the lug 19 on the cross bar 17 and alongside one of the movable main jaws so that both the auxiliary jaw and one of the main jaws will be locked in position by the trigger 18 when engaged by the notch in the treadle 9. This treadle 9 is pivotally mounted on a post 16 carried by a cross bar 17 secured as above stated to the base 4 of the trap. The trigger 18 which is adapted to bear on and hold one of the jaws in open position when the trap is set, is pivotally connected to a lug 19 formed on the end of the bar 17, its free end being adapted to engage with notch *c* of the treadle. While it is generally preferred that both the main and auxiliary jaws should be operated by integral coils, as shown in Figs. 1, 3, 4 and 5 they may be operated by independent coils as shown in Fig. 2. As therein shown, the coils 12°, employed for operating the main jaws, have tangential extensions 30 which will pass under the bar 17 and its extension 24, while the outer coils 12ᵈ have extensions 30ᵃ on the ends opposite those having the tangential extensions 27 which will pass on top of the bar 17 or its extension 24.

As a common means is employed for locking the main jaws and the auxiliary jaw 29 in open position, they will be simultaneously released and as it might happen that the auxiliary jaw would move little further than the main jaws, there will be a liability of the animal's being knocked away from the clutch of the main jaws before being fairly caught thereby, provision is made for retarding the movement of the auxiliary jaw. While any suitable means may be employed for this purpose, that shown in Figs. 1 to 5 inclusive has been found most advantageous. This retarding means consists of a finger 32 pivotally mounted in a lug 33 on the end of a bar 34 extending from the base 4 and substantially parallel with the base 4, such bar being sufficiently long that the pivotal point of the finger will be outside of the auxiliary jaw when in open position. The bar 34 may be secured to the under side of the base 4 as indicated by dotted line in Fig. 1, or may be made integral with the lug 3 on the base 4 as shown in Fig. 4. The inner or free end of this finger 32 will, when the trap is set in operative position, extend under one of the main jaws as clearly shown in Figs. 1, 2 and 3. As this finger extends above the auxiliary jaw 29 it will prevent this jaw from moving as rapidly as the main jaw for the reason that the free end of the finger can move upward only in approximate proportion to the movement of the main jaw and hence the primary closing of the main jaw is insured.

This finger can also be employed as a safety catch when setting the trap. To this end one of the lugs 3 on the base 4 is provided with an extension 34ᵃ which is bent downwardly and to the outer end of this extension the finger 32 is so pivotally connected that it may be passed over the auxiliary jaw 29 when in open position and its free end caused to bear against some stationary part of the trap, as for example, the finger may be shifted into a notch 35 in the bar 34. While in this position the auxiliary jaw would be held in open position as shown in Fig. 4. After the auxiliary jaw is thus locked, the main jaws can be opened and locked in position by the trigger, the locking of the main jaw by the trigger simultaneously locking the auxiliary jaw by the trigger. After these jaws have been locked by the trigger, the finger 32 is shifted from the notch 35 so that its free end will bear against the under edges of one of the main jaws as shown in Fig. 3, thereby permitting of the closing of the auxiliary jaw when released from the trigger. In order to insure a predetermined movement of the main jaws prior to any substantial closing movement of the auxiliary jaw, a notch or shoulder 36 may be formed in the edge of one of the main jaws as shown in Fig. 4 and the finger 32 placed in such notch or against such shoulder after being shifted out of the holding notch 36. This shoulder will prevent the finger 32 from escaping engagement with the main jaws until after the latter have accomplished a substantial part of their closing movement.

In order to ensure the shifting of the finger from engagement with the main jaw, the main jaw with which the finger is to engage is so mounted in the lug 3 that when the main jaws are in closed position the outer edge of the lug will be outside of the edge of the jaw and the notch or shoulder 36 is so located that as the main jaw closes, the finger will strike against the edge of the lug 3 and be forced out of engagement with the shoulder or notch before the main jaw has completed its closing movement or simultaneously with its completion of such movement.

I claim herein as my invention:

1. An animal trap having in combination pivotally mounted main jaws, an auxiliary jaw having its pivotal axis at an angle to the axes of the movement of the main jaws, a lever provided with fingers adapted to shift and lock the main jaws in closed position, a spring operatively connected to said lever and to the auxiliary jaw and means for releasably holding the main jaws and auxiliary jaws.

2. An animal trap having in combination pivotally mounted main jaws, a pivotally mounted auxiliary jaw, means for shifting the main jaws and the auxiliary jaw from open to closed position, means adapted to be released by the animal for preventing the operation of the jaw-closing means, and means operative after the release of the jaw-closing means for controlling the movement of the auxiliary jaw by the movement of one of the main jaws.

3. An animal trap having in combination pivotally mounted main jaws, a pivotally mounted auxiliary jaw movable through an arc greater than ninety degrees, a spring adapted to engage and shift the main and auxiliary jaws, a treadle, and means controlled by the treadle for preventing the operation of the jaw closing means.

4. An animal trap having in combination pivotally mounted main jaws, a pivotally mounted auxiliary jaw the pivotal axis of the auxiliary jaw being at an angle to the axis of the main jaw, and movable through an arc greater than ninety degrees, resilient means for shifting the main jaws and the auxiliary jaw, a treadle and means controlled by the treadle for simultaneously locking the main and auxiliary jaws in open position.

5. An animal trap having in combination pivotally mounted main jaws, an auxiliary jaw, having its pivotal axis at right angles to the axes of movement of the main jaws, a coil spring having tangential extensions at its ends, one of said extensions adapted to engage and shift the main jaws and means operative by the other extension for shifting the auxiliary jaws.

6. An animal trap having in combination pivotally mounted main jaws, a pivotally mounted auxiliary jaw, means for shifting the main and auxiliary jaws to closed position, releasable means for holding the main and auxiliary jaws in open position and means independent of said releasable means for holding the auxiliary jaw in open position and adapted to be shifted from locked position to a position where its movement will be controlled by a main jaw.

7. An animal trap having in combination pivotally mounted main jaws, a pivotally mounted auxiliary jaw, means for shifting the main and auxiliary jaws to closed position, releasable means for holding the main and auxiliary jaws in open position, means adapted to hold the auxiliary jaw in open position and to engage the main jaw when in open position and means for shifting such holding means out of engagement with the main jaws during their closing movement.

8. An animal trap having in combination a pair of pivotally mounted main jaws, a pivotally mounted auxiliary jaw, means for shifting the main and auxiliary jaws to closed position, releasable means for holding the main and auxiliary jaws in open position, and a releasable means for holding the auxiliary jaw in open position during the setting of the main jaws.

9. An animal trap having in combination a pair of pivotally mounted main jaws, a pivotally mounted auxiliary jaw having its axis of movement at an angle to the axes of the main jaws, a spring operatively connected to the main jaws and to the auxiliary jaw and adapted to force the main and auxiliary jaws to closed position, and a releasable means for holding said jaws in open position.

10. An animal trap having in combination a pair of pivotally mounted jaws, a spring consisting of two separated helices for closing said jaws, a shaft passing through the helices, and bearings for the ends of the shaft and for the portion intermediate the helices.

11. An animal trap having in combination pivotally mounted main jaws, a pivotally mounted auxiliary jaw, means for shifting the main and auxiliary jaws to closed position, releasable means for holding the main and auxiliary jaws in open position, a finger pivotally connected to a stationary part of the trap and adapted to be adjusted to position above the auxiliary jaw and under one of the main jaws when the jaws have been set in open position.

In testimony whereof, I have hereunto set my hand.

WALTER A. GIBBS.